(12) United States Patent
Block et al.

(10) Patent No.: US 6,234,559 B1
(45) Date of Patent: May 22, 2001

(54) RIGID TONNEAU COVER WITH INTEGRAL STORAGE BOX

(75) Inventors: David C. Block, Redlands; Gerald B. Block, Hemet, both of CA (US)

(73) Assignee: Vista Consolidated, Inc., San Bernardino, CA (US)

( * ) Notice: Subject to any disclaimer, the term of this patent is extended or adjusted under 35 U.S.C. 154(b) by 0 days.

(21) Appl. No.: 09/587,597

(22) Filed: Jun. 5, 2000

(51) Int. Cl.$^7$ ............................................. B60P 7/02
(52) U.S. Cl. ................... 296/100.06; 296/296; 296/37.6
(58) Field of Search ................ 296/37.6, 100.06, 296/100.07, 100.08, 100.09, 100.1

(56) References Cited

U.S. PATENT DOCUMENTS

| | | |
|---|---|---|
| D. 329,998 | 10/1992 | Sutton et al. . |
| D. 335,850 | 5/1993 | Cryson . |
| D. 365,080 | 12/1995 | Loughlin . |
| D. 403,292 | 12/1998 | Bogard . |
| D. 421,736 | 3/2000 | Bogard . |
| 3,489,456 * | 1/1970 | Klanke . |
| 3,765,717 | 10/1973 | Garvert . |
| 3,854,621 * | 12/1974 | Parry . |
| 4,216,990 * | 8/1980 | Musgrove et al. .............. 296/37.6 X |
| 4,288,011 * | 9/1981 | Grossman ....................... 296/37.6 X |
| 4,488,669 * | 12/1984 | Waters . |
| 4,615,557 | 10/1986 | Robinson . |
| 4,789,197 | 12/1988 | Lewis . |
| 4,813,735 | 3/1989 | Avitable . |
| 4,824,162 | 4/1989 | Geisler et al. . |
| 4,967,944 * | 11/1990 | Waters ............................ 296/37.6 X |
| 5,087,093 | 2/1992 | Repetti . |
| 5,169,200 * | 12/1992 | Pugh ................................. 296/37.6 |
| 5,188,414 * | 2/1993 | Burnham et al. ................. 296/37.6 |
| 5,316,358 * | 5/1994 | Patne et al. ....................... 296/37.6 |
| 5,564,773 * | 10/1996 | Lapsley et al. . |
| 5,584,521 * | 12/1996 | Hathaway et al. .............. 296/37.6 X |
| 5,595,417 | 1/1997 | Thoman et al. . |
| 5,636,893 | 6/1997 | Wheatley et al. . |
| 5,848,744 * | 12/1998 | Dischner et al. ............... 296/37.6 X |
| 5,961,173 * | 10/1999 | Repetti .............................. 296/37.6 |

* cited by examiner

*Primary Examiner*—Joseph D. Pape
(74) *Attorney, Agent, or Firm*—Knobbe, Martens, Olson & Bear, LLP

(57) ABSTRACT

A rigid, Tonneau cover assembly for a pickup truck bed wherein the cover assembly comprises a panel member and an integral tool box. The low profile cover assembly comprises a panel member positioned flush to a rim of the truck bed and an integral tool box fixedly mounted to the panel member and positioned in an interior region of the truck underneath of the panel member so as to be concealed from view. A plurality of access doors are formed on the panel member so as to provide quick access to the tool box.

19 Claims, 8 Drawing Sheets

RIGID TONNEAU COVER WITH INTEGRAL STORAGE BOX

BACKGROUND OF THE INVENTION

1. Field of the Invention

The invention relates to protective covers for the open, cargo section of pickup trucks and more particularly to a low profile, rigid Tonneau cover assembly which includes two separate integral, self-contained storage boxes.

2. Description of the Related Art

The open, cargo section of a truck, such as the bed of a pickup, is typically used to haul cargo or store objects that do not fit in the limited cab space. One particular drawback, however, is that objects placed in the open, cargo section is exposed to the weather, to vandalism and to theft, all of which can damage or destroy the cargo if proper protection is not taken. Furthermore, cargo placed in the truck bed must be secured during transportation otherwise sudden movements of the truck can cause objects such as bags of groceries, tools and the like to spill across the truck bed floor. Additionally, the large, open area typically afforded to truck beds does not readily lend itself to storing smaller objects, such as tools, that are better kept in compartments.

To address these particular problems, various covers and containers have been developed for improving the storage condition in the bed of the pickup truck. One particular example comprises a Tonneau cover made of either a soft fabric or rigid fiberglass, designed to cover the interior of the truck bed and thus afford the contents of the truck bed with some protection from the weather, theft, and vandalism. The prior art also teaches various sectionalized rigid covers comprising individually connected panels designed for easier access to different sections of the truck bed as described in U.S. Pat. No. 4,824,162; U.S. Pat. No. 3,765,717; U.S. Pat. No. 4,813,735.

Although the covers taught by prior art all more or less provide some protection for the cargo from weather elements, vandalism, and theft, they are nonetheless aerodynamically unappealing. In particular, they are typically designed so that the cover does not hug the rim of the truck bed, leaving a highly visible gap between the edge of the cover and the rim. Moreover, the top surface of the cover typically extends substantially higher than the rim of the truck bed, so as to further detract from its overall aerodynamic appeal.

Furthermore, the traditional means for securing smaller objects such as tools in the open cargo space includes the mounting of permanent storage boxes positioned directly behind the back cab window. Although these boxes fulfill the purpose of storing objects such as tools, they are high profile and obtrusive, making the truck less sleek and aerodynamically appealing. These high profile storage boxes are conspicuous and in some cases even unsightly as they typically consist of large box-shaped structures made of colors that do not match that of the truck. Additionally, the visibility of the high profile storage box can attract unwanted attention, making it a target for thieves and vandals. Moreover, the high profile boxes are generally inconvenient to use as they are not accessible from the side of the truck. Individuals often have to climb onto the truck bed to open the box cover and reach for the items stored therein. As such, the high profile storage boxes become inaccessible when the truck bed is filled with cargo or when the truck is parked in a location that is not conducive to climbing onto the truck bed.

Furthermore, storage boxes that are separately mounted to the truck bed typically require installing permanent mounting devices via brackets, rivets, or other fasteners along the walls of the truck bed. Installation of permanent mounting devices requires tools and skills not readily available to those who are not adept at such manual tasks. Drilling holes into the walls of the truck bed, for instance, requires familiarity with the usage of power tools in addition to manual dexterity and mechanical know-how. In fact, someone who is not experienced in working with mechanical tools may damage the surface of truck bed when trying to place mounting devices into the metal walls. Furthermore, pickup truck owners who are particular about the appearance of their trucks are unlikely to want to incur any kind of damage or surface alteration, no matter how minor, to the truck bed.

Thus, the storage boxes taught by the prior art are undesirable in that they are not readily accessible and require separate installation procedures that are time consuming and could potentially damage the surface of the truck bed. In fact, a careful search shows only one prior reference that even remotely mentions placing drop-in supply boxes in the truck bed that do not need to be permanently mounted. Yet, the supply boxes described in U.S. Pat. No. 4,813,735 is not an integral part of the cover, but rather an independent entity that is not securely anchored to the truck bed. When the storage box is not securely anchored to the truck bed, it can slide and move around during transportation and possibly cause its contents to spill.

Hence from the foregoing, it will be appreciated that there is a need for a low profile truck bed cover assembly wherein the cover conforms to the contours of the truck and includes multiple self-contained, integral storage boxes that can be conveniently accessed. It is further desirable that the installation process of the cover assembly is relatively simple and does not require drilling or any other permanent alterations to the surface of the truck bed.

SUMMARY OF THE INVENTION

The aforementioned needs are satisfied by the rigid Tonneau cover assembly of the present invention. In one aspect, the cover assembly has a low profile and conforms to the general contour of a pickup truck so as to be a non-obtrusive and integral part of the truck. Preferably, the cover comprises a back panel and two integral storage compartments wherein each compartment has a top opening, wherein an access door is positioned over each opening. Furthermore, the back panel and the compartment doors are designed to be positioned level and flush with each other when they are fully closed so as to form a single planar surface that serves as the outer surface of the cover.

Furthermore, the cover is dimensioned to fit over the truck bed in a manner such that a first and second side edge of the back panel line up respectively with a side edge of each compartment door. In particular, the side edges of the panel and doors extend parallel to the side walls of the truck bed and overlay an upper surface of the side walls, while the rear edge of the panel extends parallel to and overlays an upper surface of the back wall of the truck bed. Moreover, each side edge is downwardly curved so as to conform to the general contour of the side walls of the truck bed. In one embodiment, the edge of the cover is configured to have its side edges hug the rims of the side walls in a manner such that the distance between a top surface of the cover and a side wall rim does not exceed three inches. More particularly, the side edges extend outward over the rim of the bed of the pickup truck and curve downward such that the outer edge of the cover is substantially coplanar with the outer walls of the bed of the pickup truck.

In one embodiment, the cover comprises a light but sturdy material such as fiberglass and extends across the interior region of the truck bed so as to cover and protect the contents therein. Furthermore, the cover includes a back panel wherein the back panel can be lifted open so as to provide access to the truck bed. To secure the back panel in a closed position, a rotary latch is used, in one embodiment, to ensure the panel remain closed during transportation. Moreover, a plurality of elongated seals are positioned in a manner so as to form a water tight seal between the truck bed and the back panel. Preferably, when the cover is properly mounted, the back panel is placed over a substantial portion of the truck bed and the two integral compartments are positioned in an interior region of the truck bed directly behind a cab area, wherein each compartment has a top opening that is covered by an access door. When closed, the compartment doors are positioned horizontally across the openings and configured to form a single, seamless cover with the back panel.

Unlike the typical, high profile storage boxes mounted in pickup trucks, the integral compartments of this particular embodiment are substantially enclosed and concealed from view, a unique feature designed to discourage potential thieves and vandals. Moreover, the storage compartments of the preferred embodiment are convenient to use as they can be easily accessed through conveniently placed side doors and therefore reduce the need for an individual to climb into the truck bed or lift up large panel sections in order to access the compartments. Moreover, since the compartments are an integral part of the cover, they do not need to be separately installed like other known storage containers.

In another embodiment, each compartment comprises a plurality of sections wherein the sections are designed to store smaller objects such as tools as well as larger items such as brief cases, bags of grocery, or small suitcases. In particular, a first section comprises a narrowly recessed region wherein tools and other smaller objects can be securely stored. Additionally, a second section comprises a larger cavity wherein larger items such as sporting goods can be placed. Furthermore, the compartments are positioned so that they do not rest on the floor of the truck bed, thereby leaving sufficient space for long objects such as lumber or tools to slide under the compartments so as to take full advantage of the entire length of the truck bed.

Preferably, each compartment is covered by a hinge mounted door that pivots about a plurality of hinges that is parallel to the longitudinal axis of the bed so as provide side access to the compartments. The plurality of hinges are affixed to each door such that the hinges are not exposed to view when the doors are in a closed position. To secure the door in a closed position, a rotary latch is preferably used to ensure that the door remains closed during transportation. Additionally, a seal member is also placed along a top surface of each compartment so as to form a watertight seal between the compartment and the door. Furthermore, a rain gutter is formed around each compartment so as to channel water away from the compartments. The watertight seal in conjunction with the rain gutter keep the contents of the compartments dry during routine car washes or heavy downpours.

In another embodiment, a protective guard is attached to an outer surface of the two compartments so as to protect the compartments from being damaged by other objects stored within the interior region of the bed. In one embodiment, the protective guard comprises a structural material horizontally bonded to the outer surface of the compartments so that it protrudes from the compartments and serves as a protective buffer preventing sharp or heavy objects from piercing or denting the compartments. Moreover, in this embodiment, when the compartment doors and the cover are fully closed, they collectively form an outer surface that is substantially planar and hugs the rims of the truck bed so as to be low profile and unobtrusive. In one embodiment, the outer edge of the compartment doors defines a curved lip that extends over the rim of the pickup truck so as to curve downward over the rim of the pickup truck with the outer edge of the compartment doors being substantially coplanar with the outer walls of the bed of the pickup truck. Furthermore, in one embodiment, the outer surface of the cover is configured to be crowned in manner that is adequate to channel water to flow to the side, front, and back edges of the truck bed.

From the foregoing, it will be appreciated that the aspects of the present invention introduce a new rigid, Tonneau cover assembly that is low profile and includes at least one integral storage compartment that is concealed from view. The rigid, Tonneau cover assembly of the present invention not only addresses the undesirable aspects of storing objects in the open, cargo section of a pickup truck, but also provides a cover assembly design that conforms to the contours of the truck bed and is aesthetically appealing and aerodynamically favorable. Advantageously, a section of the cover, particularly the back panel, can be easily removed while leaving the storage compartments intact so as to expose a rear portion of the truck bed to allow for fifth wheel towing. Additionally, the cover assembly design comprises a crowned outer surface that channels water to flow down the front, back, and sides of the truck bed and a seal member that provides a waterproof seal between the cover member and the truck bed so as to protect the contents therein. The cover assembly design also eliminates the need of having to separately install containers such as tool boxes to the pickup truck. These and other objects and advantages of the present invention will become more apparent from the following description taken in conjunction with the following drawings.

DETAILED DESCRIPTION OF THE PREFERRED EMBODIMENT

Reference will now be made to the drawings wherein like numerals refer to like parts throughout. As will be described hereinbelow, the preferred embodiment provides a low profile, rigid Tonneau cover assembly comprising a back panel, two self-contained integral storage compartments with an access door covering a top opening of each compartment, wherein the access doors and the back panel are so dimensioned as to be flush with each other when the doors and the panel are all in a closed position.

Figure 1:
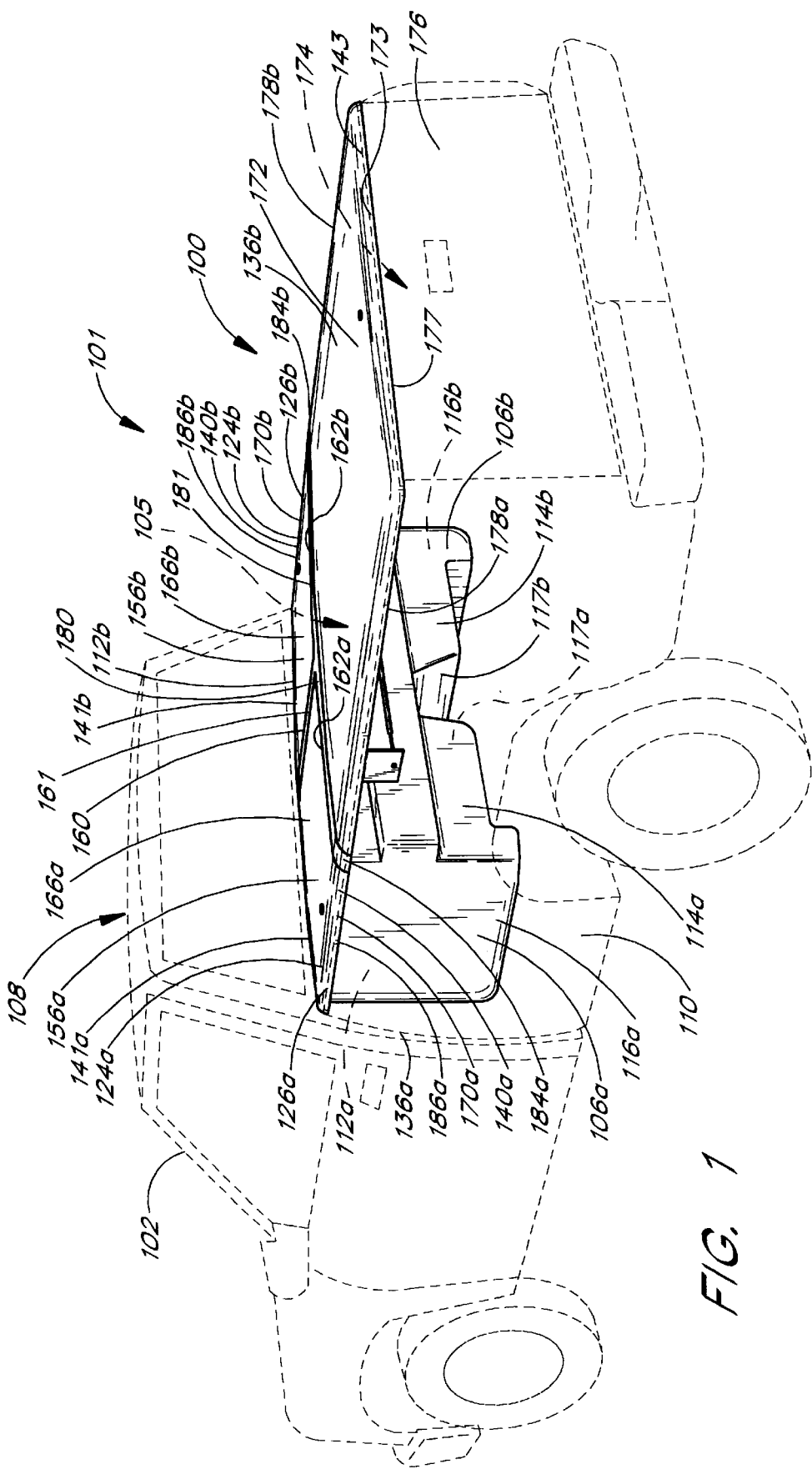
FIG. 1 is a simplified perspective view of one embodiment of a low profile, rigid Tonneau cover assembly comprising a back panel and two separate integral, self-contained storage boxes.

FIG. 1 illustrates a preferred embodiment of a low profile, rigid Tonneau cover assembly 100 for a standard pickup truck 102. As shown in FIG. 1, the cover assembly 100 includes a first integral storage compartment 106a positioned adjacent to a second integral storage compartment 106b wherein the compartments 106a, 106b extend across the width of a truck bed 110 and are adapted to store tools and other items in a manner to be described in greater detail below.

The integral storage compartments 106a, 106b are generally rectangular in shape so as to define an interior region. It will be appreciated that although a generally rectangular-shaped storage compartment has been illustrated in FIG. 1, any wide variety of shapes could be utilized without departing from the scope of the invention. As FIG. 1 further illustrates, each storage compartment 106a, 106b has a front wall 112a, 112b, a back wall 114a, 114b, an outer side wall 116a, 116b, and an inner side wall 117a, 117b such that a generally outer perimeter is defined. Preferably, the storage compartments 106a, 106b are designed to be positioned in a front interior region 105 of the truck bed 110 directly behind a cab 108 of the truck 102 wherein the outer side walls 116a, 116b of the storage compartments 106a, 106b are adjacent and parallel to a side 136a, 136b of the truck bed 110, wherein the front walls 112a, 112b of the compartments 106a, 106b are adjacent and parallel to a front wall of the truck bed.

As FIG. 1 further illustrates, the outer side wall 116a, 116b of each storage compartment 106a, 106b is generally planar and has a first lip 126a, 126b that extends horizontally outward from an upper edge 124a, 124b of the sidewall 116a, 116b such that the first lip 126a, 126b extends in a plane that is substantially perpendicular to the plane of the respective side wall 116a, 116b. As will be shown in greater detail below, each storage compartment 106a, 106b also has a second lip that extends horizontally outward from an upper edge 141a, 141b of the front wall 112a, 112b of each storage compartment 106a, 106b such that the second lip extends in a plane that is substantially perpendicular to the plane of the front wall 112a, 112b.

Figure 2:
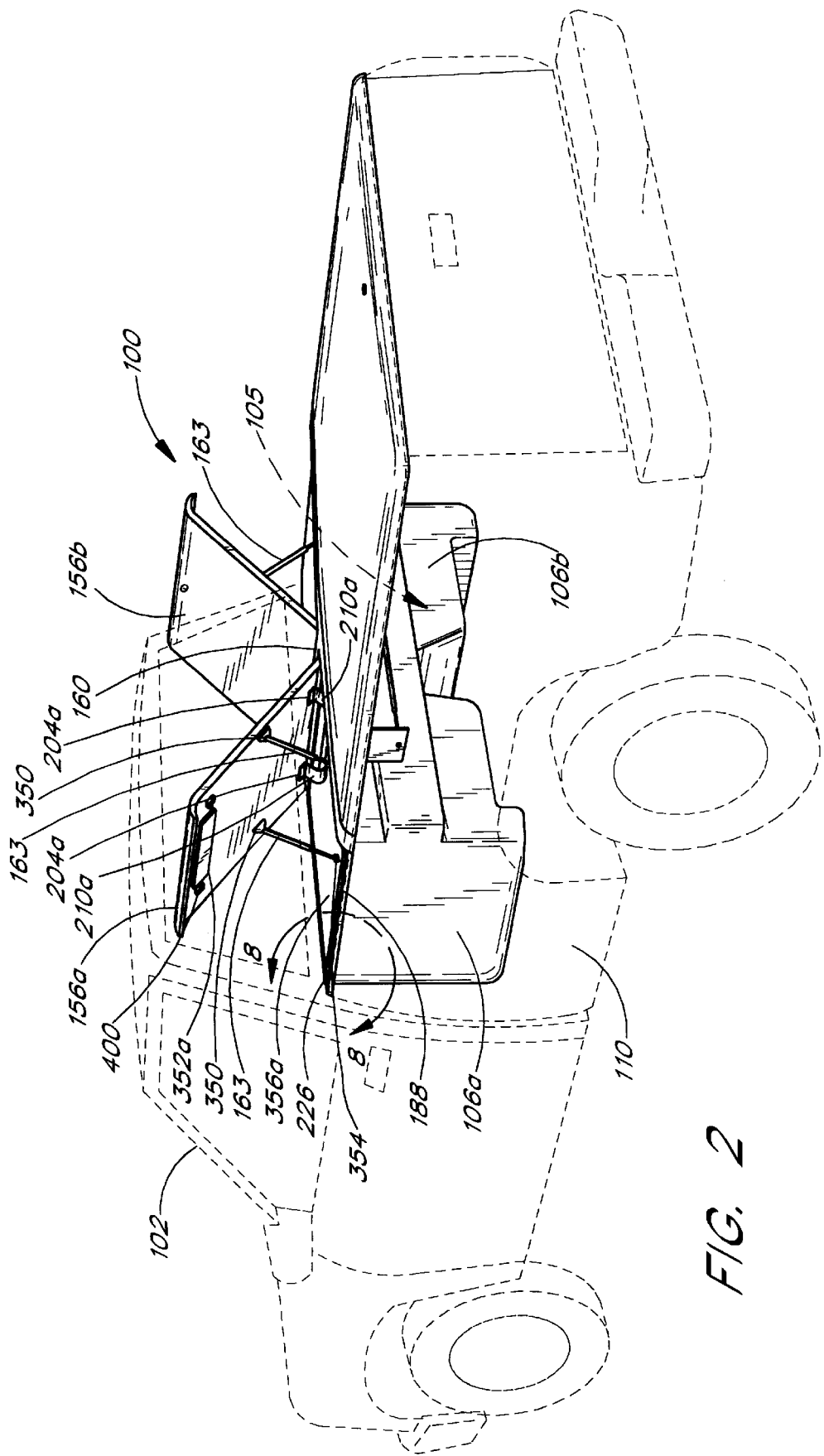
FIG. 2 is a simplified perspective view of the cover assembly of FIG. 1 wherein a plurality of access doors are in an open position over the integral, self-contained storage boxes.
Figure 3:
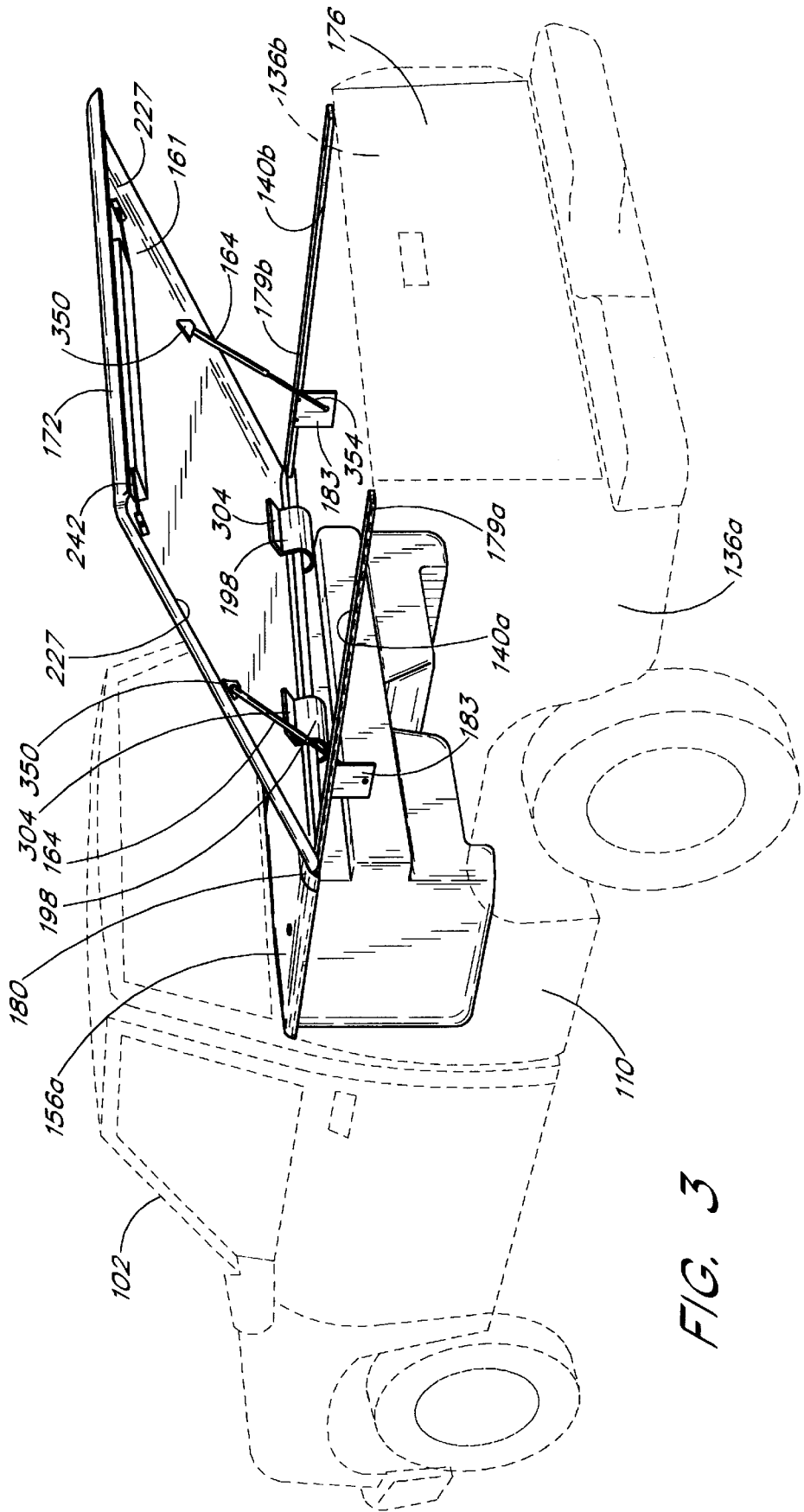
FIG. 3 is a simplified perspective view of the cover assembly of FIG. 1 wherein the back panel is in an open position.

Preferably, the first lip 126a, 126b of each integral storage compartment 106a, 106b is dimensioned to rest respectively on an upper surface 140a, 140b of the side wall 136a, 136b of the truck bed 110 when the cover assembly 100 is placed on the truck bed 110 as shown in FIGS. 1, 2 and 3. Moreover, the outer sidewalls 116a, 116b of the storage compartments 106a, 106b are configured to extend downward from the upper surface 140a, 140b of the side walls 136a, 136b of the truck bed 110 into the front interior region 105 so that the compartments 106a, 106b are substantially recessed in the truck bed 110. In particular, the weight of the compartments 106a, 106b along with a plurality of J-bolts (not shown) effectively anchor the first lips 126a, 126b of the compartments to the side walls 136a, 136b of the truck. Likewise, as will be shown in greater detail below, the second lip of each compartment 106a, 106b is preferably dimensioned to rest on an upper surface of a front wall (not shown) of the truck bed 110 so as to provide further supported for the compartments 106a, 106b.

This particular design is advantageous as it allows the cover assembly 100 to be mounted without needing to drill holes or install any permanent clamps to the truck bed 110 that could alter or damage its surface. In particular, the cover assembly 100 of the illustrated embodiment can be mounted to the truck bed 110 with relative ease in a manner such that the integral storage compartments 106a, 106b are anchored by their own weight and secured from movement by a plurality of J-bolts to be described in greater detail below.

Moreover, advantageously, the lips 126a, 126b of the compartments overlay the top surface of the rims of the truck bed so as to form a substantially water tight seal, thereby inhibiting the entry of water into the truck bed. In particular, the upper surface of the lip 126a, 126b is curved so as to curve downward towards the upper rail of the side walls 136a, 136b. Moreover, the outer edge 127a, 127b (FIG. 4) of the lip 126a, 126b is positioned so as to be substantially adjacent the outer walls of the side walls 136a, 136b of the pickup truck 100 to thereby prevent entry of water into the bed of the pickup truck and to conform the contour of the containers 106a, 106b to the outer walls of the pickup truck.

As FIG. 1 further illustrates, the first and second compartments 106a, 106b have respectively a first door 156a and a second door 156b that are generally rectangular and planar. However, it will be appreciated that there are a wide variety of other shapes that can be utilized without departing from the scope of the invention. The first and second doors 156a, 156b are adapted to fit over a top opening of the first and second compartments 106a, 106b respectively so as to conceal the compartments from view and protect the contents therein.

Preferably, when the compartment doors 156a, 156b are in a closed position as illustrated in FIGS. 1 and 3, they are positioned horizontally over the compartments 106a, 106b so as to be substantially coplanar with each other. Furthermore, in keeping with the low profile design of the cover assembly, the maximum vertical distance between the upper surface 140a, 140b of the side wall 136a, 136b and a top surface 166a, 166b of the compartment door 156a, 156b does not exceed three inches in the preferred embodiment. Unlike the covers suggested by prior art, the doors 156a, 156b of this particular embodiment are not significantly raised above the rims of the truck bed 110. In fact, as will be described in greater detail below, the doors 156a, 156b, when fully closed, are designed to overlay and hug the upper surface or rim 140a, 140b of the side walls 136a, 136b so that the cover appears as an integral part of the truck 102. In particular, when the doors 156a, 156b are fully closed, a side edge 170a, 170b of each door 156a, 156b overlays the upper surface 140a, 140b of the side walls 136a, 136b in a manner so as to cover the first lips 126a, 126b of the compartments 106a, 106b that are positioned over the side walls 136a, 136b such that the side edges 170a, 170b are substantially coplanar with the outer side walls of the truck bed and the outer edges 127a and 127b of the lips 126a, 126b. Furthermore, the side edge 170a, 170b of each door 156a, 156b curves downwardly so as to hug the upper surface 140a, 140b of the respective side wall 136a, 136b.

As will be described in greater detail below, the first lip 126a, 126b of each compartment 106a, 106b has a similar downward curvature so as to allow the lips 126a, 126b to fit conformably under the doors 156a, 156b respectively. The doors 156a, 156b in turn are configured to conform to the contour of the pick up truck 102 and maintain a low profile appearance that is aesthetically pleasing and aerodynamically favorable. Another advantage afforded by the downward curvature of the side edges 170a, 170b of the compartment doors 156a, 156b is that the side edges 170a, 170b effectively channel water to flow from the top surface 166a, 166b of each door 156a, 156b down the side walls 136a, 136b of the truck bed 110.

Furthermore, as will be described in greater detail below, each door 156a, 156b is hinge mounted to a first support 160 that is positioned between the compartments 106a, 106b. As FIG. 1 shows, the first support 160 is generally elongated in shape and extends from the upper edge 141a, 141b of the front wall of the compartments 106a, 106b to an upper edge 162a, 162b of the back wall 114a, 114b of the compartments 106a, 106b. Furthermore, the first support 160 is formed so that an upper surface 161 of the first support 160 is generally coplanar with the upper surface 166a, 166b of the doors 156a, 156b when the doors 156a, 156b are closed over the compartments 106a, 106b in the manner shown in FIGS. 1 and 3. The first support 160 is configured to be generally coplanar with the closed compartment doors and therefore is less noticeable and blends in with the flat profile of the cover assembly.

As is also shown in FIG. 1, the cover assembly 100 has a second support 180 that is generally elongated in shape and extends the entire length of the upper edge 162a, 162b of the back wall 114a, 114b of the compartment 106a, 106b in a direction transverse to the longitudinal axis of the truck bed 110. The second support 180 is also raised so that an upper surface 181 of the second support 180 is substantially coplanar with both the first support 160 and the compartment doors 156a, 156b when the doors 156a 156b are closed over the compartments 106a, 106b in a manner as illustrated in FIGS. 1 and 3.

Additionally, the second support 180 has a plurality of side edges 184a, 184b that rest on the upper surface 140a, 140b of the side walls 136a, 136b and curve downwardly in a similar fashion as the sides edges 170a, 170b of the compartment doors 156a, 156b so as to overlay and hug the upper rails 140a, 140b of the side walls 136a, 136b. In particular, the second support 180 is dimensioned so that its side edges 184a, 184b form a substantially straight line with the side edges 186a, 186b of the compartment doors 156a, 156b respectively. Furthermore, the line thus formed is parallel to the top surface 140a, 140b of the side walls 136a, 136b so as to make the compartment doors 156a, 156b and the second support 180 appear as one integral piece positioned over the truck bed 110. One advantage of this configuration is that it allows discrete sections of the cover assembly 100 to appear as one continuous cover that overlays and hugs the side walls 136a, 136b of the truck bed 110.

As is illustrated in FIG. 1, the cover assembly 100 further comprises a back panel 172 that is generally rectangular, planar and positioned horizontally so as to cover a back interior region 174 of the truck bed 110 wherein the back interior region 174 is defined by the back wall 114a, 114b of the compartments 106a, 106b and a back wall 176 of the truck bed 110. Furthermore, the back panel 172 is hinge mounted to the second support 180 of the truck bed 110 in a manner to be describe in greater detail below. In particular, when the back panel 172 is in a closed position, it rests on the top surface 140a, 140b of the side walls 136a, 136b and a top surface 143 of a back rail 177. Furthermore, as shown in FIG. 1, the back panel 172, in a closed position, is substantially coplanar with the closed doors 156a, 156b, the first support 160, and the second support 180 so that their collective outer surface appears as one seamless, continuous cover protecting the truck bed 110.

Preferably, the back panel 172 has two side edges 178a, 178b wherein each side edge is downwardly curved and overlays the upper surface 140a, 140b of the side walls 136a, 136b so as to conform to the general contour of the side walls 136a, 136b. Furthermore, the back panel 172 has a rear edge wherein the rear edge 177 is also downwardly curved so as to overlay an upper surface 173 of the back wall 176 and conform to the contour of the back wall 176. Furthermore, the back panel 172 is positioned so that its side edges 178a, 178b are parallel and collinear with the side edges 184a, 184b of the second support 180 and with the side edges 186a, 186b of the compartment doors 156a, 156b. When the side edges of the back panel, compartment doors, and second support are thus lined up with each other, the cover assembly appears as one integral whole with indistinguishable discrete components, which advantageously adds to the sleekness of the design and is also aerodynamically advantageous.

As is also shown in FIG. 1, when the back panel 172 and the compartment doors 156a, 156b are closed, the hinges used to connect them to the cover assembly 100 are concealed below the cover assembly 100. Moreover, the outer surface 101 of the cover, formed by the compartment doors, the back panel, and the first and second supports, is preferably slightly crowned so that water will flow outward toward the front, back, and side rails of the pickup truck. This particular feature prevents water from accumulating on the cover and keeps the top surface substantially dry. As discussed above, the upper surfaces of the compartment doors 156a, 156b, the back panel 172, the first support 160 and the second support 180 are substantially coplanar. In other words, the upper surfaces have substantially the same curvature such that the rate of curvature on the various upper surfaces is continuous across the width and length of the upper surfaces.

In one embodiment, the back panel 172 is made from a light but sturdy fiberglass material that is well known in the art. The fiberglass material provides a glossy, smooth surface that is resistant to wear and tear, so that the panel 172 will remain aesthetically appealing even after prolonged exposure to harsh weather conditions. Typically, the back panel 172 is made from material of the same color and composition as those used to construct the compartment doors 156a, 156b and the first and second supports 160, 180. In fact, it is preferred that the color of the cover assembly 100 matches that of the truck bed 110 so as to make the already low profile cover assembly 100 even less obtrusive and conspicuous.

Hence, in the embodiment as illustrated in FIG. 1, the outer surface of the cover assembly 100 is generally planar and hugs the side walls 136a, 136b so as to maintain a flat, low profile design. Additionally, the self-contained, integral compartments 106a, 106b are completely concealed by the compartment doors 156a, 156b and nests in the front interior region 105 of the truck bed 112 directly behind a cab area 108 where most high profile tool boxes are typically mounted. Unlike the typical high profile tool boxes, however, the integral storage compartments 106a, 106b of the illustrated embodiment is not exposed to plain view and therefore does not attract unwanted attention from potential thieves and vandals and is easier to access. Its low profile configuration is also in line with the overall aerodynamically favorable design of the cover assembly 100. Furthermore, the storage compartments 106a, 106b are positioned so that they do not rest on the floor of the truck bed, which allows sufficient room for individuals to store long objects such as lumber or tools in the truck bed so as to take full advantage of the length of the truck bed.

Moreover, since the back panel 172 is attached to the compartments 106a, 106b along the entire width of the two compartments 106a, 106b, the back panel 172 and the integral compartments 106a, 106b define a surface that entirely covers the bed of the pickup truck. It will be appreciated that the truck bed cover of the preferred embodiment is designed so that the entry of water into the bed of the pickup truck is inhibited. Hence, the advantageous functionality of a storage compartment can be used in conjunction with a substantially water tight rigid Tonneau cover so as to inhibit access to the rest of the truck bed and also allow for storage of articles in the truck bed in a substantially water tight environment.

Referring now to FIG. 2, the compartment doors 156a, 156b are mounted to pivot about a plurality of door hinges 210a, 210b (not shown) in a direction parallel to the longitudinal axis of the truck bed 110 so as to allow each door 156a, 156b to be opened from the side of the truck bed 110. As will be described in greater detail below, a first end 204a, 204b (not shown) of each door hinge 210a, 210b is fixedly attached to an inner surface 352a, 352b (not shown) of the doors 156a, 156b while a second end is inserted through an opening formed on an inner side wall (not shown) of each compartment 106a, 106b so that the second end of each door hinge 210a, 210b can be attached to a first female hinge (not shown) mounted to a bottom surface of the first support 160. Since the door hinges 210a, 210b are connected on both ends to surfaces facing the interior region 105 of the truck bed 110, they remain concealed from view once the doors 156a, 156b are in a closed position.

Furthermore, in the illustrated embodiment, the doors 156a, 156b can be opened and closed from the sides of the truck bed 110 so as to provide ready access to the storage compartments 106a, 106b from either side of the pickup truck 102 without requiring an individual to climb into the truck bed. In contrast to storage boxes known in the art, the compartments 106a, 106b of the preferred embodiment are convenient to use as the compartment doors 156a, 156b are sized and configured so that they can be easily accessed and opened.

Moreover, when the doors 156a, 156b are in an open position as shown in FIG. 2, a plurality of support members 163, generally shaped like rods, are positioned between the doors 156a, 156b and the compartments 106a, 106b. Each support member 163 is mounted in a well known manner wherein a first end 350 is attached to the inner surface 352a, 352b (not shown) of the door 156a, 156b, while a second end 354 is attached to an inner surface 356a, 356b (not shown) of the containers 106a, 106b respectively. Preferably, each support member 163 comprises a compressed piston, well known in the art, that is biased in a direction that keeps the doors 156a, 156b pivoted up in manner as illustrated in FIG. 2. In particular, the piston 163 pops open the door 156a, 156b once the door is released from a latch and keeps the door 156a, 156b open while objects are being loaded to and from the compartments 106a, 106b. One advantage of the support members 163 as shown in FIG. 2 is that they obviate the need of having to manually hold up the doors 156a, 156b over the containers 106a, 106b while cargo is being loaded or unloaded.

FIG. 2 further shows each doors 156a, 156b having a latch mechanism 400 comprising a rotary latch that is well known in the art. As will be described in detail below, when the latch mechanism 400 is activated, the door 156a, 156b presses down on the compartments 106a, 106b so as to form a watertight seal with a first seal member 226 positioned on a rim 188 of the tool box 104. Preferably, once the rotary latch is released, the compressed piston 163 automatically pops open the door 156a, 156b without requiring an individual to physically lift open the door. Referring now to FIG. 3, the back panel 172 of the cover assembly 100 is shown in an open position. As is illustrated in FIG. 3, the back panel 172 is hinge mounted to a lateral surface (not shown) of the second support 180 so as to pivot about a plurality of panel hinges 198 in a direction perpendicular to the longitudinal axis of the truck bed 110 so that it can be opened from the back wall 176 of the truck bed 110. The hinge assembly will be described in greater detail in reference to FIG. 7 hereinbelow. However, from the embodiment illustrated in FIG. 3, it can be appreciated that a first end 304 of each panel hinge 198 is fixedly mounted to an inner surface 161 of the back panel 172 while a second end is attached to a second female hinge (not shown) attached to a bottom surface of the second support 180. As suggested by FIG. 3, the manner in which the panel hinges 198 are mounted allows them to remain concealed once the panel member 172 is closed, all in keeping with the overall flat profile of the cover assembly. Furthermore, the back panel 172 can be easily removed from the cover assembly by disengaging the panel hinges so as allow for fifth wheel towing. In particular, the removal of the back panel 172 does not disturb the storage compartments so that individuals may continue to use the compartments while the back panel 172 is removed from the truck bed.

As FIG. 3 further illustrates, the back panel 172 is kept open with the support of a plurality of support members 164 that are similar to those used for keeping the compartment doors 156a, 156b open as illustrated previously in FIG. 2. As shown in FIG. 3, the first ends 350 of the support members 163 are fixedly attached to the inner surface 161 of the back panel 172 while the second ends 354 are fixedly attached to a plurality of plates 183 that are mounted to a plurality of rail structures 179a, 179b to be described in greater detail below. As described earlier, each support member 164 comprises a piston-like rod that is biased in the direction that keeps the back panel 172 in an open position. Hence, the support members 164 effectively hold open the back panel 172 while cargo is being loaded or unloaded.

FIG. 3 shows the back panel 172 also uses a rotary latch 242 to secure the panel 172 from movement during transportation. As shown in FIG. 3, the rotary latch 242 is positioned on the inner surface 161 of the back panel 172 near the back wall 176 of the truck bed 110 and is designed to secure the back panel 172 in place during transportation. Preferably, the rotary latch 242 along with a second seal member 227 attached to the inner surface 161 of the back panel 172, allows the back panel 172 to form a watertight seal with the upper surface 140a, 140b of the side walls 136a, 136b of the truck bed 110 in a manner to be described in greater detail below.

Figure 4:
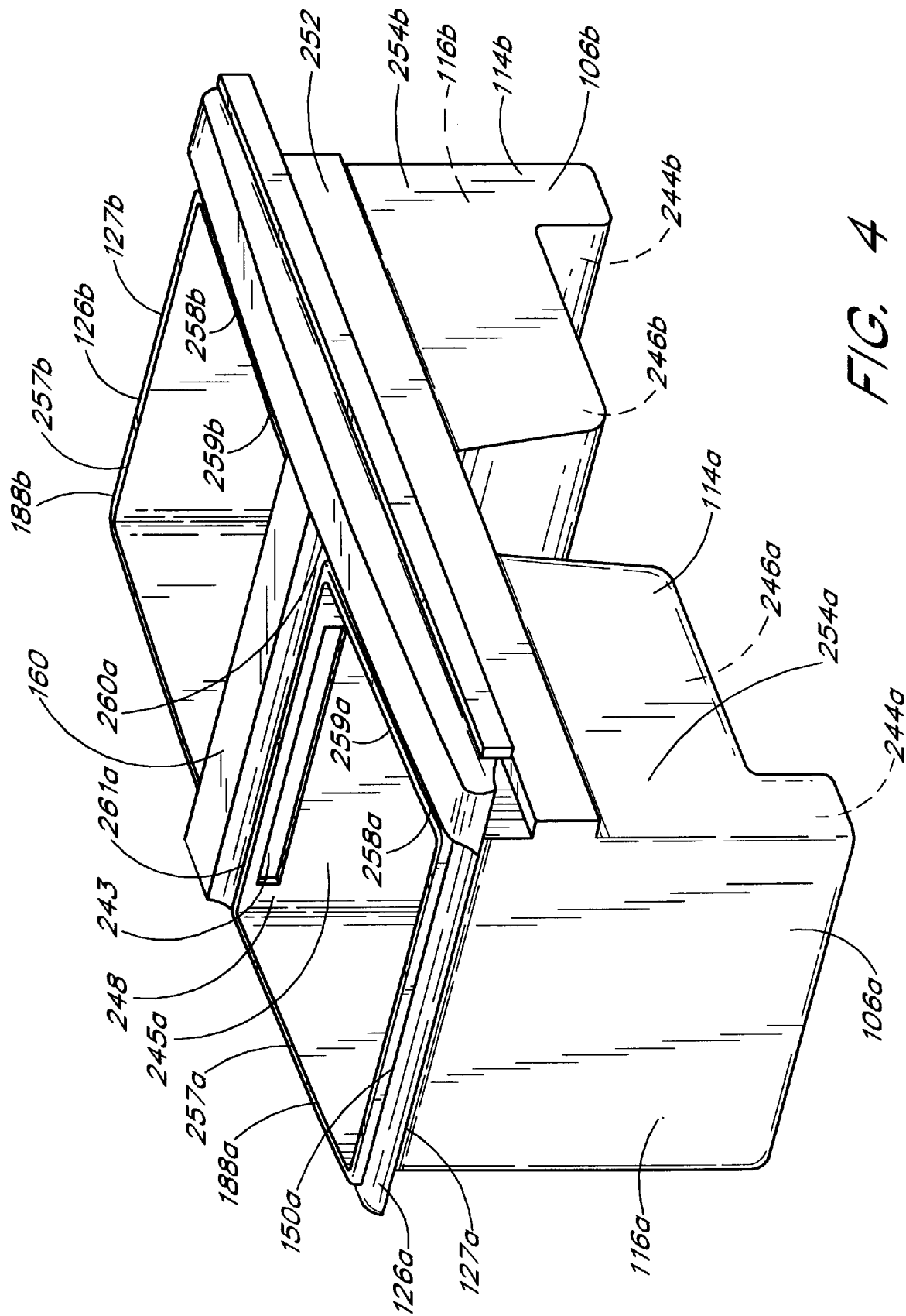
FIG. 4 is an exploded perspective view of the integral, self-contained storage boxes of the cover assembly of FIG. 1.

FIG. 4 provides an exploded perspective view of the integral compartments 106a, 106b with a more detailed description of an opening 243 configured for the mounting of door hinges. As shown in FIG. 4, the opening 243, generally rectangular in shape, is formed on an upper region 248 of the inner side walls 245a, 245b (not shown) of each compartment 106a, 106b. The opening 243 is dimensioned so that a second end of each door hinge will fit through the opening 243 so as to be attached to a first female hinge mounted to the bottom surface of the first support 160 in a manner to be described in greater detail below.

FIG. 4 further shows each compartment 106a, 106b having a narrowly recessed cavity 244a, 244b located adjacent to a larger second region 246a, 246b. The recessed cavity 244a, 244b is intended for storing smaller objects such as tools, flashlights, and other items that are likely to scatter if not kept in a small, confined compartment. Additionally, the recessed cavity 244a, 244b is positioned adjacent to the side of the truck bed 110 so as to provide an easier reach for frequently used tools. The more spacious second region 246a, 246b of the compartment 106a, 106b is intended for keeping larger items such as bags of groceries, books, briefcases, small suitcases, sporting goods, or other items that need a larger area to store, but still require a certain amount of confinement so as to prevent from being scattered across the floor of the truck bed 110. As is further illustrated in FIG. 4, the compartments 106a, 106b also have a protective guard 252 that is attached to an outer surface 254a, 254b of the back wall 114a, 114b. In one embodiment, the protective guard 252 comprises a piece of structural material bonded to the back walls 114a, 114b so as to protect other objects in the truck bed 110 from hitting against and damaging the tool box and its contents therein.

Additionally, FIG. 4 also shows a first water channel 258a, 258b formed along a first rim 259a, 259b of the compartment 106a, 106b. The first water channel 258a, 258b is a recessed and elongated region that spans across the width of compartments 106a, 106b. The first water channel 258a, 258b in conjunction with the overall crowned contour of the cover 100 as described earlier direct water to flow down the side walls of the truck bed 110 instead of leaking into the compartments 106a, 106b. As is also shown in FIG. 4, a second water channel 260a, 260b (not shown) is formed along a second rim 261a, 261b (not shown) of the compartment 106a, 106b. The second water channel 260a, 260b is also recessed and elongated in shape and used in conjunction with the overall crowned feature of the cover assembly to direct water to flow forward down the front of the compartments 106a, 106b.

In addition to the water channels 258a/b, 260a/b, the compartments 106a, 106b of this particular embodiment also comprises other features designed to keep water out. As is illustrated in FIG. 4, a third and fourth rim 188a, 188b of the compartments 106a, 106b are raised along with the second rim 259a, 259b so that a first seal member (not shown) can be placed on a top surface 257a, 257b of the rims in a manner so as to keep a water tight seal around the compartments 106a, 106b. When the compartment doors are closed and latched over the compartments 106a, 106b, the force exerted by the doors is concentrated in the relatively narrow, raised top surface 257a, 257b of the rims so as to allow the doors to push tightly against the first seal member that is placed on the top surface 257a, 257b. As such, the rims in conjunction with the first seal member (not shown) effectively provide a watertight seal between the doors 156a, 156b and the compartments 106a, 106b respectively when the doors are closed and latched over the containers 106a, 106b in a manner as described above.

Figure 5:
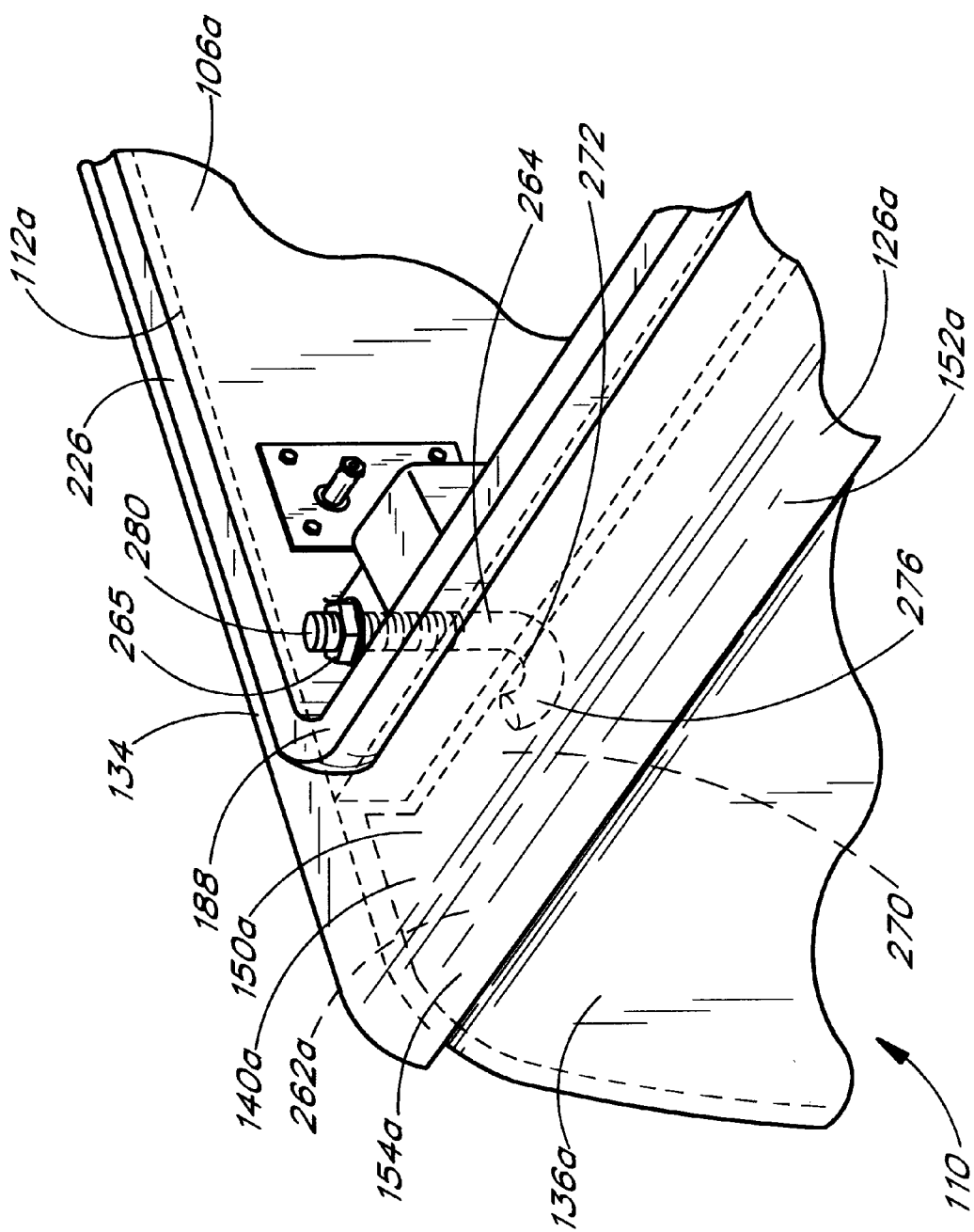
FIG. 5 is an exploded sectional view of the interface between a corner of a storage box and the truck bed of FIG. 1.

As is also shown in FIG. 4, the first lips 126a, 126b of the compartments 106a, 106b curve downwardly in a manner described previously. The advantages of having such downward curvature is best illustrated by FIG. 5, which provides an exploded partial view of a top interface between the integral compartments and the truck bed. As shown in FIG. 5, the first lip 126a of the compartment 106a has an inner portion 150a defined by a section that extends from the side wall of the compartment 106a to an outer top edge 262a of the side wall 136a of the truck bed 110. The inner portion 150a of the first lip 126a is parallel to the top surface 140a of the side wall 136a. It is further preferred that adjacent to the inner portion 150a is an outer portion 152a defined by a section that extends past the outer top edge 262a of the side wall 136a. As described earlier, the outer portion 152a curves downwardly so as to overlay a similarly contoured side walls 136a. The downward curvature of the outer portion 152a of the first lip 126a is intended to improved the aesthetic appeal of the integral compartment 106a by making it less obtrusive and more conforming to the contours of the pickup truck 102.

Furthermore, as shown in FIG. 5, as the first lip 126a spans from the side wall 116a (not shown) of the compartment 106a to an outer surface 154a of the side wall 136a, it effectively covers the gap in between the compartment side wall 116a (not shown) and the truck side wall 136a so as to prevent water or other contaminants from seeping through the gap into the truck bed. A similar benefit is also derived from the second lip 134 being positioned between the front wall 112a of the compartment 106a and the front wall of the truck bed as it effectively covers any openings, however narrow, between the front wall 112a of the compartment 106a and the front wall of the truck bed. One advantage of such design is that it prevents water and other debris from accumulating in interior regions of the truck bed, especially in areas that are hard to reach and clean such as the narrow space between the compartments and the walls of the truck.

FIG. 5 also shows the previously described first seal member 226 positioned along the rim 188a of the compartment 106a. The first seal member 226 is elongated in configuration and prevents water from seeping into the compartment 106a when the compartment doors are closed and latched in manner described above. In one embodiment, the first seal member 226 comprises a rubber gasket material that is well known in the art which effectively insulates the compartments from all moisture when the compartment doors are closed and the rotary latch forces the doors to press tightly on the first seal member 226.

Additionally, FIG. 5 further illustrates a bolt member 264 used to anchor the compartment 106a to an inner surface 270 of the truck bed. The bolt member 264 is generally J-shaped and structurally engages the rim 188a of the compartment 106a with an inner lip 272 on the side wall 136a of the truck bed 110 so as to secure the compartment 106a to the truck bed 110 without the need to drill any holes. A U-shaped bottom end 276 of the bolt member 264 protrudes out from a collar (not shown) formed on a top portion the side wall 116a of the compartment 106a. The U-shaped bottom end 276 extends outward from the collar and is hooked under the inner lip 272 on the side wall 136a of the truck bed 110 thereby connecting the compartment 106a to the side wall 136a. Meanwhile, a nut member 265 is placed over a relatively straight top end 280 of the bolt member 264 and tightened so as to secure the bolt member 264 to the side wall 136a. As it can be appreciated, the bolt member 264 affixes the compartment 106a so that the compartment will not be displaced when the pickup truck experiences sudden movements. Unlike the drop-in storage boxes suggested by prior art, the storage compartment 106a of the illustrated embodiment is firmly anchored to the truck bed by the bolt member 264 so as to preclude any undesirable movement typically experienced by unsecured storage boxes. Furthermore, unlike the traditional storage boxes that are permanently affixed to the truck bed, the storage compartment of the illustrated embodiment does not require drilling of any holes into the surface of the truck bed and yet still be able to attain the stability typically afforded to tool boxes that are permanently anchored to the truck bed.

Figure 6:
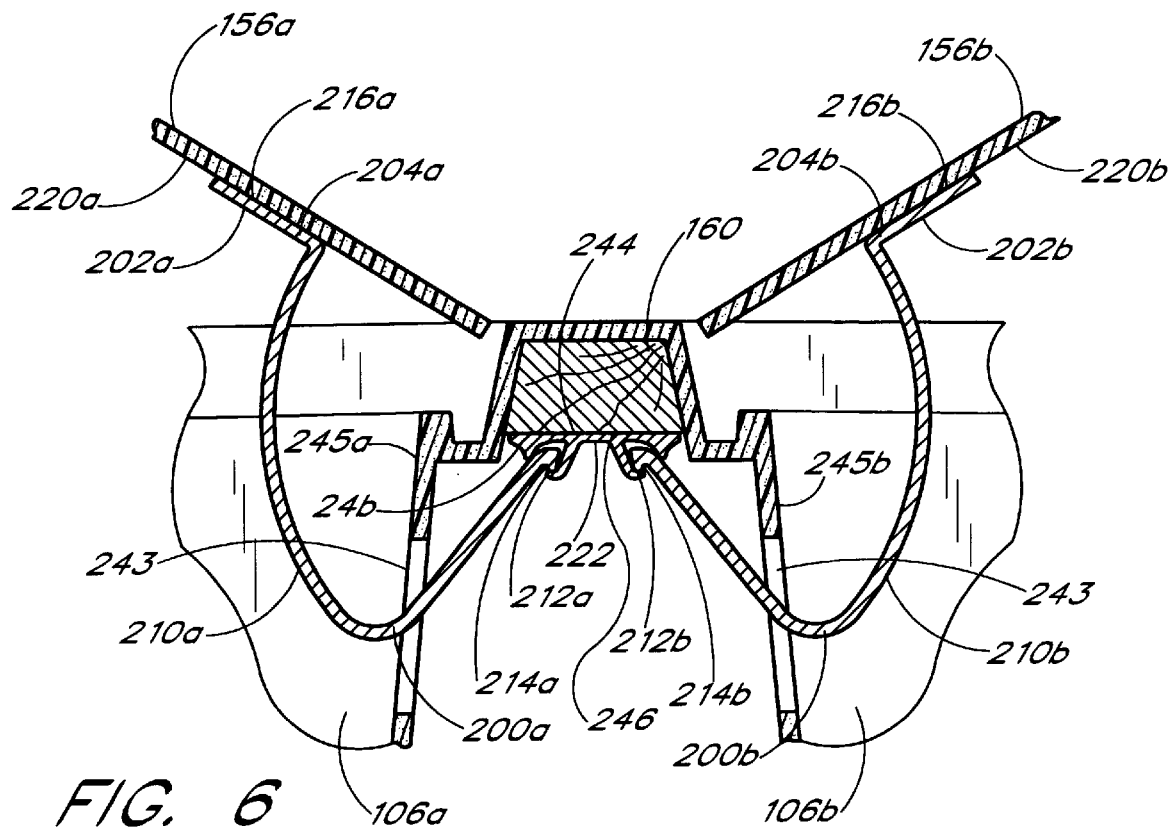
FIG. 6 is an exploded front view of the door hinge mechanism used in the cover assembly of FIG. 1.

FIG. 6 illustrates an exploded view of the earlier described door hinges 210a, 210b interconnecting the doors 156a, 156b to the compartments 106a, 106b. The door hinges 210a, 210b are generally C-shaped, having a first lip 202a, 202b extending outwardly from a first end 204a, 204b of a C-shaped section 200a, 200b and a second lip 212a, 212b extending outwardly from a second end 214a, 214b of the C-shaped section 200a, 200b. As FIG. 6 further shows, an outer surface 216a, 216b of each first lip 202a, 202b is fixedly attached to an inner surface 220a, 220b of each door 156a, 156b, while each second lip 212a, 212b is inserted through the opening 243 formed on the inner side walls 245a, 245b of the compartments 106a, 106b so as to be detachably mounted to a first female hinge 222. It is advantageous to have each door hinge 210a, 210b attached to only inner surfaces of the cover assembly 100 in the manner described above as it keeps the entire hinge concealed from view once the doors 156a, 156b are closed.

As is further shown in FIG. 6, a second surface 244 of the first female hinge 222 is fixedly attached to a inner surface 246 of the first support 160 so as to be recessed from view. Each door hinge 210a, 210b is therefore not exposed to view when the doors 156a, 156b are in a fully closed position as each door hinge 210a, 210b is attached to concealed inner surfaces. In particular, when the doors 156a, 156b are closed, the door hinges 210a, 210b are contained within the front interior region of the truck bed 110. One advantage of such design is that the doors 156a, 156b, in a closed position, form a substantially flat surface that conforms to the contour of the pickup truck 102.

Figure 7:
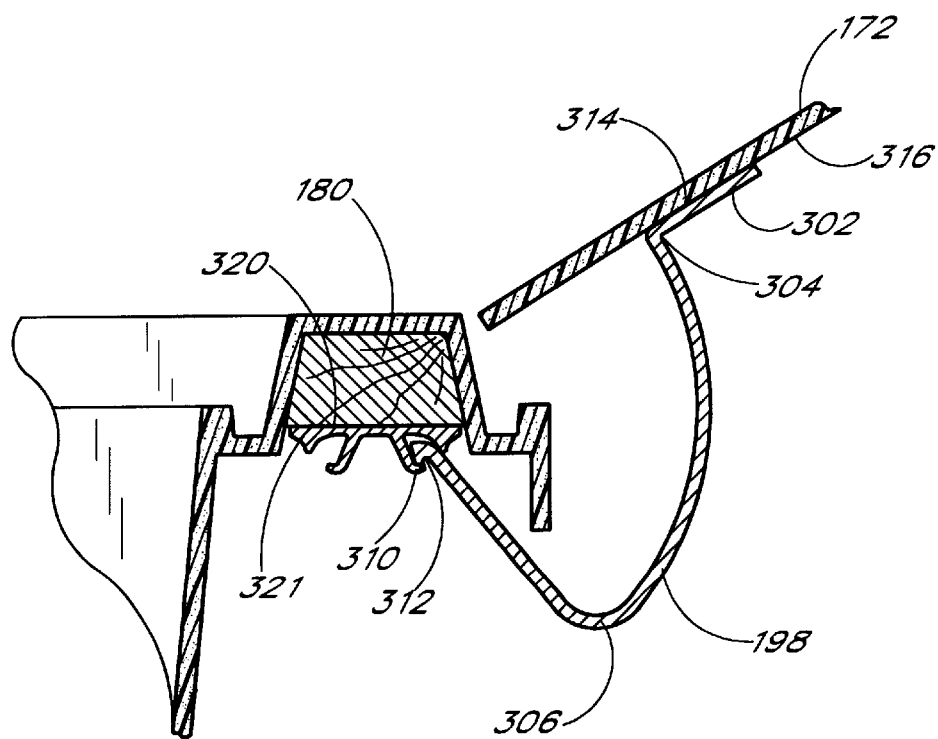
FIG. 7 is an exploded front view of the panel hinge mechanism used in the cover assembly of FIG. 1.

A similar hinge mechanism is also used to interconnect the back panel 172 to the second support 180 as shown in FIG. 7. The panel hinges 198 are generally C-shaped and have a first lip 302 extending from a first end 304 of a C-shaped section 306 and a second lip 310 that extends from a second end 312 of the C-shaped section 306. As described earlier, a top surface 314 of the first lip 302 of each panel hinge 198 is fixedly attached to an inner surface 316 of the back panel 172. Additionally, the second lip 310 is pivotably mounted to a second female hinge 320 that is attached to a bottom surface 321 of the second support 180 in a manner as shown in FIG. 7. Once the back panel 172 is closed, the panel hinges 198 will not be exposed to view so as to afford the back panel 172 a flat outer surface.

Figure 8:
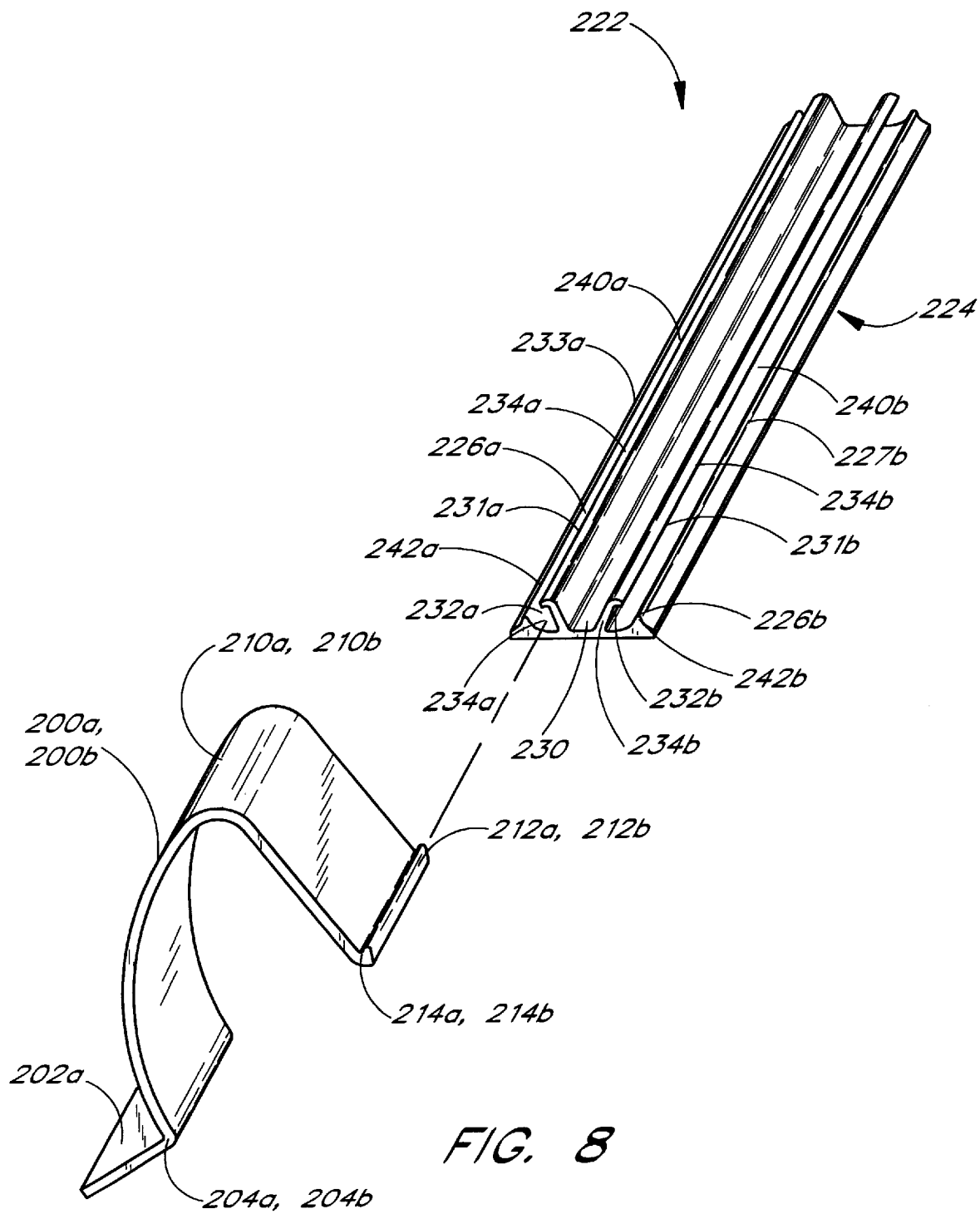
FIG. 8 is a view of the manner in which the door or panel hinge is mounted to a female hinge of the cover assembly of FIG. 1.

Referring now to FIG. 8, the manner in which each door hinge 210a, 210b is mounted to the first female hinge 222 positioned under the first support 160 is illustrated. The first female hinge 222 comprises an elongated support member 224 having a plurality of grooves 226a, 226b formed along a first surface 230 of the elongated support member 224. The grooves 226a, 226b are adjacent to each other and extend the length of the first female hinge 222. As FIG. 8 further illustrates, a lip 232a, 232b protrudes outward along an upper edge of a first side wall 234a, 234b of each groove 226a, 226b respectively such that the lips 232a, 232b extend in a plane substantially perpendicular to the plane of the first side wall 234a, 234b.

As FIG. 8 further illustrates, the manner in which each door hinge 210a, 210b is mounted to the first female hinge 222 comprises sliding the second lip 212a, 212b of the door hinge 210a, 210b into an aperture 240a, 240b of the groove 226a, 226b. The aperture 240a, 240b of each groove 226a, 226b is a region defined by the first side wall 234a, 234b and a second side wall 242a, 242b. A distance 231a, 231b between the lip 232a, 232b of the first side wall 234a, 234b and a top edge 233a, 233b of the second side wall 242a, 242b is dimensioned so as to be smaller than the thickness of the second lip 212a, 212b of the door hinges 210a, 210b so that the second lip 212a, 212b of the door hinges 210a, 210b cannot be easily pulled out of the groove 226a, 226b. Yet the aperture 240a, 240b is dimensioned so as to be large enough to allow the second lip 212a, 212b rotational movement inside each respective groove 226a, 226b. The hinge mounting mechanism as illustrated in FIG. 8 allows the doors 156a, 156b and the back panel 172 to be easily removed in cases when additional vertical storage space is needed.

Figures 9A, 9B:
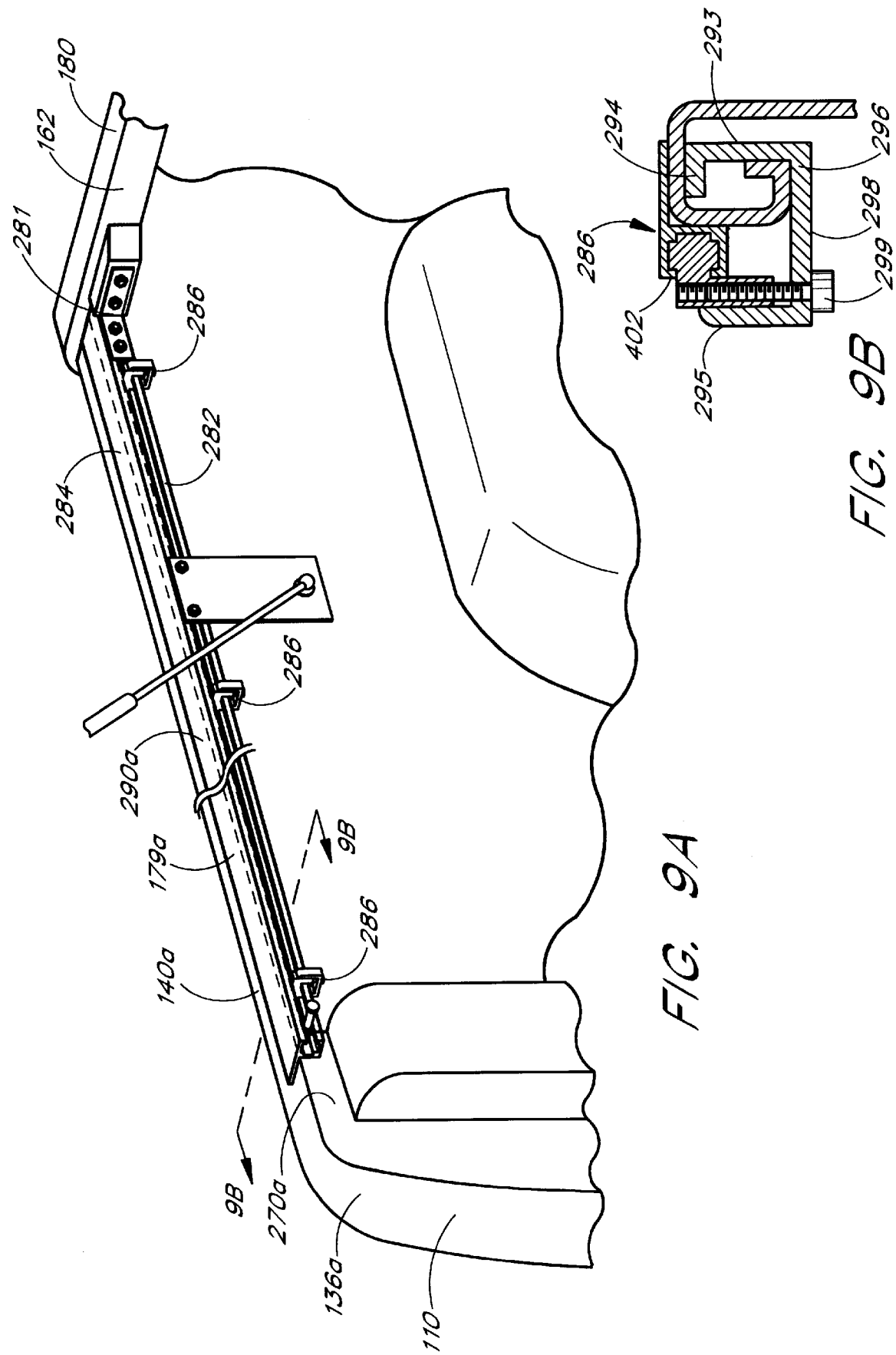
FIG. 9A is an exploded sectional view of the rail structure of the cover assembly of FIG. 1.
FIG. 9B is a simplified view of the clamp used to mount the rail structure of FIG. 9A.

The cover assembly 100 is further secured to the truck bed 110 with the aid of a plurality of rail structures 179a, clamped to the side walls 136a, of the truck bed 110. FIG. 9A shows an exploded view of the rail structure 179a, placed along the top surface 140a, of the respective side walls 136a, 136b of the truck bed 110. For illustration purposes, only one of the rail structures is shown in FIG. 9A. Each rail structure 179a comprises a metal rod 282 and an extruded metal piece 284 mounted by a series of clamps 286 to an inner surface 270a, 270b of the side walls 136a, 136b. Additionally, the rail structures 179a are fixedly connected on a first end 281 to the lateral surface 162 of the second support 180 of the integral compartments (not shown) so as to secure the compartments to the truck bed 110. Furthermore, the rail structures 179a, having a relatively flat top surface 290a, provides a level surface for the second seal member that is attached to the inner surface of the back panel to rest on so that a watertight seal can be formed once the back panel is closed and latched to the truck bed 110.

FIG. 9B shows an exploded view of one embodiment of the clamp 286 used to mount the rail structures 179a, 179b to the truck bed 110 wherein the clamp 286 comprises a metal piece 296 and a bolt 299. The metal piece 296 is generally U-shape defined by a horizontal bottom member 298, first vertical side member 295, and a second vertical side member 293. In particular, the second vertical side member 293 is bent inwardly in a perpendicular manner. In this embodiment, the bent second vertical side member 293 is hooked into an inner lip of the side walls 136a, 136b of the truck bed 110. Furthermore, to connect each clamp 286 to the rail structures 179a, 179b, the bolt 299 is inserted through the horizontal bottom member 298 of the metal piece 296 into a metal extension 402 that extends downward from the rail structure 179a. Thus, the metal piece 296 of the clamp 286 is secured to the metal extension 402 of the rail structure 179a, 179b. Consequently, each rail structure 179a is affixed to the side rails 142a, 142b via a series of the clamps 286 in a manner described above.

The rail structures 179a provides a flat surface for mounting the second seal member and anchors the tool box in the front interior region of the truck bed. The rail structures 179a, clamped to the side rails 140a of the truck bed 110, are affixed to the second support 180 of the compartments so that the second support 180 will not slide or be displaced whenever the back panel 172 is lifted. In fact, the back panel 172 can be easily removed from the cover assembly by disengaging the second lip of the panel hinge from the second female hinge without dislodging the integral compartments. This design is advantageous as it allows the back panel to be removed so as to expose an area in the truck bed to allow for fifth wheel towing.

Hence, the disclosed embodiment provides a low profile, rigid Tonneau cover assembly comprising a back panel and two integral compartments that are positioned in an interior region of the truck bed so as to be concealed from view. Furthermore, the rigid Tonneau cover assembly is designed so that its side edges overlay and hug a top surface of the side walls of the truck bed so as to maintain a sleek, aerodynamically advantageous appearance. Additionally, the cover forms a watertight seal with the truck bed so that the contents inside interior region of the truck bed are protected from water. Additionally, the integral compartments fits snugly in the truck bed, and is anchored to the truck bed so that it does not move during transportation.

This invention offers advantages of being able to provide not only a protective cover for the truck bed, but also low profile, integral compartments that are securely positioned inside the truck bed under the cover so that the contents therein are protected not only from the weather elements but also vandals and thieves. Unlike drop-in storage boxes as taught by the prior art, the integral compartments of the present invention are fixedly mounted to the frame of the cover assembly so as to prevent the compartment from moving during transportation. Moreover, the compartments are part of the cover assembly so that there is no need for additional installations. The inventive process, therefore, provides a low-profile, aesthetically appealing Tonneau cover assembly comprising two integral compartments that are concealed from view and are fixedly anchored to the truck bed.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions, but should be defined by the appended claims.

What is claimed is:

1. A rigid Tonneau cover assembly for a pickup truck having a bed wherein the bed is defined by a plurality of side walls, the assembly comprising:

a container having an upper surface and a rim extending at least partially about the upper perimeter of the container wherein the rim is dimensioned so as to be positioned on the upper surface of the plurality of side walls so as to mount the container in the bed of the pickup with the container extending downward from the upper surfaces of the plurality of side walls into the bed of the pickup;

at least one door member pivotally attached to the container, wherein the at least one door member is movable between an open position, wherein access to the interior of the container is provided and a closed position wherein the interior of the container is enclosed, wherein the at least one door member has an upper surface that is substantially co-planar with the upper surface of the container when the door is in the closed position; and a panel member pivotally attached to the container so as to extend outward therefrom, wherein the panel member is movable between an open position, wherein access to the bed of the pickup truck is provided and a closed position wherein the interior of the bed of the pickup truck is enclosed and wherein the panel member is dimensioned so that when the panel member is in the closed position, the outer perimeter of the panel member is positioned on the upper surfaces of the side walls of the bed of the pickup truck and wherein the panel member defines an upper surface that is substantially co-planar with the upper surface of the container and the upper surface of the door of the container when the panel member is in the closed position.

2. The assembly of claim 1, wherein the container includes at least two door members that are pivotally attached to the container so as to each pivot about two parallel axes that are parallel to the longitudinal axis of the bed of the pickup truck.

3. The assembly of claim 2, wherein the rim of the container is adapted to mount to the upper surface of two side walls of the bed of the pickup truck and an upper surface of a front wall of the bed of the pickup truck.

4. The assembly of claim 1, wherein the upper surface of the container and the upper surface of the panel member is substantially co-planar with a plane defined by the upper surfaces of each of the side walls and the front wall of the bed of the pickup truck so that the rigid Tonneau cover assembly has a low profile.

5. The assembly of claim 4, wherein the plane of the upper surface of the container and the plane of the back panel is no greater than a distance of 3 inches from a plane defined by the upper surfaces of the side walls of the pickup truck.

6. The assembly of claim 1, wherein the at least one door extends out to the outer perimeter of the container so that an outer end of the door is positioned over the rim about the upper surface of the container and wherein the outer end of the door is rounded so as to partially cover the outer edge of the rim when the door is in the closed position.

7. The assembly of claim 1, wherein the container defines an opening to the interior of the container that is covered by the at least one door member when the at least one door member is in the closed position and wherein the container includes a vertically extending lip that surrounds the opening so that an interior surface of the at least one door member contacts the vertically extending lip when the at least one door member is in the closed position so as to inhibit the entry of water into the interior of the container when the at least one door member is in the closed position.

8. The assembly of claim 7 wherein the container further defines an intermediate upper surface from which the vertically extending lip extends and wherein the vertically extending lip is positioned inward of the outer perimeter of the container so as to define a plurality of shelves surrounding the vertically extending lip.

9. The assembly of claim 8, wherein the plurality of shelves are crowned so as to channel water accumulating thereon outward beyond the perimeter of the container to thereby inhibit entry of water.

10. A rigid Tonneau cover assembly for a pickup truck having a bed wherein the bed is defined by two side walls and one back wall comprising:

a rigid back panel;

two integral storage compartments, each having a top opening wherein an access door is positioned over each top opening so as to cover the openings;

wherein the rigid back panel is pivotally attached to the storage compartments in a manner such that the back panel and the doors covering the top openings of the compartments are coplanar and flush with each other when they are in a closed position.

11. The cover assembly of claim 10 wherein the back panel is hinge mounted to the two integral storage compartments so as to pivot in a direction parallel to the longitudinal axis of the truck bed.

12. The cover assembly of claim 10 having a plurality of side edges wherein the side edges are curved in a manner so as to overlay and hug a rim of the side walls of the truck bed.

13. The cover assembly of claim 10 having a back edge wherein the back edge is curved in a manner so as to overlay and hug a rim of the back wall of the truck bed.

14. The cover assembly of claim 10 wherein each door has a side edge wherein the side edge is curved in a manner so as to overlay and hug the rim of the truck bed.

15. The cover assembly of claim 10 having an outer surface wherein the outer surface is defined by an outer surface of the back panel and an outer surface of each door.

16. The cover assembly of claim 15 wherein the outer surface is adapted to cover a top opening defined by the side walls of the truck bed.

17. The cover assembly of claim 15 further comprises a plurality of rain gutters formed on the outer surface wherein the rain gutters are adapted to prevent water from flowing into the storage compartments of the cover assembly.

18. The cover assembly of claim 10 wherein the back panel is secured to the truck bed using a rotary latch.

19. The cover assembly of claim 15 wherein the outer surface is substantially planar.

* * * * *